(No Model.)
J. CONSTANT.
TWO WHEELED VEHICLE.
No. 303,622. Patented Aug. 19, 1884.
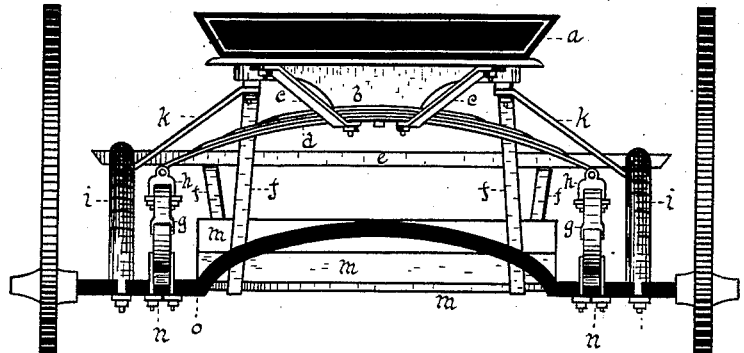
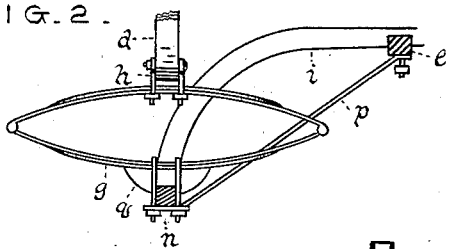
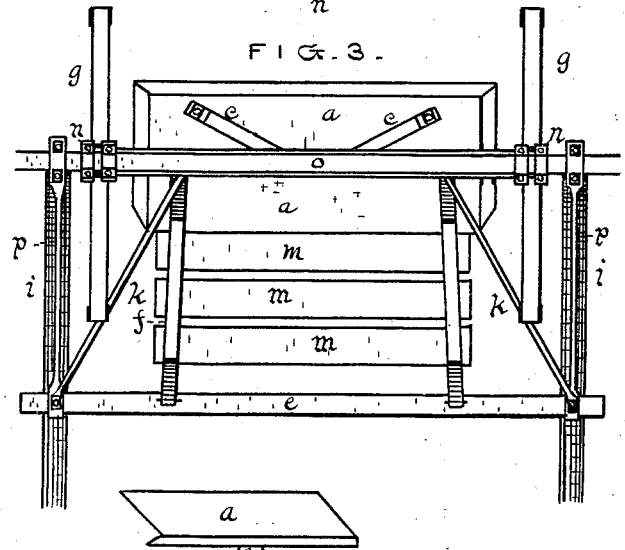
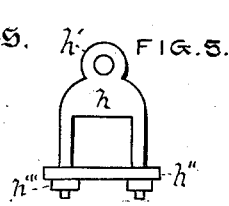
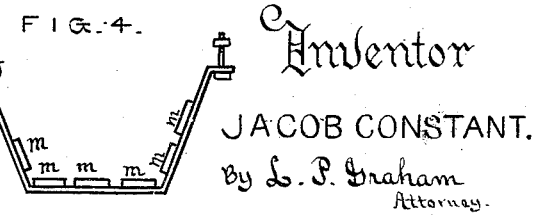
Witnesses.
P. B. Sparks
D. D. Walker
Inventor
JACOB CONSTANT.
By L. P. Graham
Attorney.

UNITED STATES PATENT OFFICE.

JACOB CONSTANT, OF DECATUR, ILLINOIS.

TWO-WHEELED VEHICLE.

SPECIFICATION forming part of Letters Patent No. 303,622, dated August 19, 1884.

Application filed May 13, 1884. (No model.)

*To all whom it may concern:*

Be it known that I, JACOB CONSTANT, a resident of the city of Decatur, county of Macon, and State of Illinois, have invented certain new and useful Improvements in Road-Carts, of which the following is a specification.

The object of my invention is to combine simplicity and stability in producing an easy-riding road-cart of superior excellence, the details of which will be hereinafter set forth by reference to the accompanying drawings, while the peculiarities of my invention will be specified in appended claims.

In the drawings accompanying and forming a part of this specification, Figure 1 is a rear elevation of my device. Fig. 2 is a side elevation of one of the side springs, showing the axle, cross-bar, and transverse spring in section. Fig. 3 is a bottom view of my device. Fig. 4 represents the seat and foot support in side elevation; and Fig. 5 illustrates the clamp used to secure the transverse spring to the side springs.

$a$ is the seat.

$b$ is a supporting-block for the seat.

$c\ c$ are braces used to support the seat in a horizontal position.

$d$ is a semi-elliptical spring, extended transversely across the cart on a line vertically with the axle.

$e$ is a cross-bar extending from shaft to shaft, and providing a point of attachment for the single-tree, (not shown.)

$f\ f$ are straps that sustain the foot-support $m\ m$.

$g\ g$ are elliptical springs that cross the axle at right angles.

$h\ h$ represent the clamps used to secure the transverse spring to the side springs.

$h'$ in Fig. 5, shows a pivot-bearing; $h''$, a cross-bar, and $h'''$ nuts for adjusting the same.

$i\ i$ are the shafts.

$k\ k$ are braces extending from support $b$ to the intersection of bar $e$ with the shafts.

$m$ represents the foot-supports.

$n$ are clamps for securing the springs $g$ to the axle.

$o$ is the axle.

$p\ p$ are braces that extend from the axle to the cross-bar $e$ on a vertical line with the shafts.

$q$ in Fig. 2 shows a block interposed between the axle and side springs.

Road-carts are generally objectionable on account of their tendency to partake of the irregular motion of the horse, while the rider is also affected by every inequality with which the wheels come in contact. The tendency of the cart to partake of the motion of the horse is caused by placing the seat on an axle to which the shafts are attached, and it follows that in order to neutralize the said motion a spring of unusual elasticity must be provided.

In order to neutralize the effect of rough roads, springs should be arranged as far as possible from the center of the seat-support, near the wheels, so that rocking will be avoided and the jarring in a great measure overcome. As the springs are elevated to a considerable height above the axle, the seat needs to be braced, but such bracing must be done in a manner that will not interfere with the operation of the springs.

I obtain the necessary elasticity by means of the long transverse spring $d$, in combination with the two side springs, $g\ g$, and I provide, in $k\ k$, braces that will not interfere with the free motion of the springs.

The side springs, $g\ g$, are attached to the axle near the shafts, and by their position prevent rocking in the seat, while their great elasticity tends in a great measure to neutralize the jar of the wheels.

Braces $c\ c$ support the seat in a horizontal position, as before intimated.

Clamp $h$ is formed in two parts, as shown in Fig. 2, and a connecting-pintle provides a bearing for spring $d$.

As indicated in plan, Fig. 3, braces $p\ k$ and strap $f$ form a figure resembling a Gothic N, four points of attachment sufficing for the same.

I prefer to construct spring $d$ with four leaves, and springs $g\ g$ with two leaves each, believing that that proportion is productive of the best results.

Having thus described my invention, I claim as new and desire to secure by Letters Patent—

1. The combination, in a two-wheeled vehicle, of axle $o$, side springs, $g\ g$, transverse spring $d$, seat $a$, shafts $i\ i$, and diagonal braces $k\ k$, as and for the purpose set forth.

2. The combination, with spring $d$, support $b$, and seat $a$, of diagonal braces $c\ c$, as and for the purpose set forth.

3. The combination, in a two-wheeled vehicle, of axle $o$, springs $g\ g$ and $d$, seat $a$, shafts $i\ i$, braces $k\ k$, and foot-support $f\ m\ m$, as and for the purpose set forth.

4. The combination, with transverse spring $d$ and elliptic springs $g\ g$, of clamps $h$, seat $a$, shafts $i\ i$, foot-support $f\ m\ m$, and braces $k\ k$, as and for the purpose set forth.

JACOB CONSTANT.

Attest:
I. D. WALKER,
J. H. CONSTANT.